May 22, 1962  N. D. ANDREAS ET AL  3,035,483
OPHTHALMOSCOPE HAVING ADJUSTABLE LAMP AND COOLING VENTS
Filed Dec. 14, 1959
2 Sheets-Sheet 1
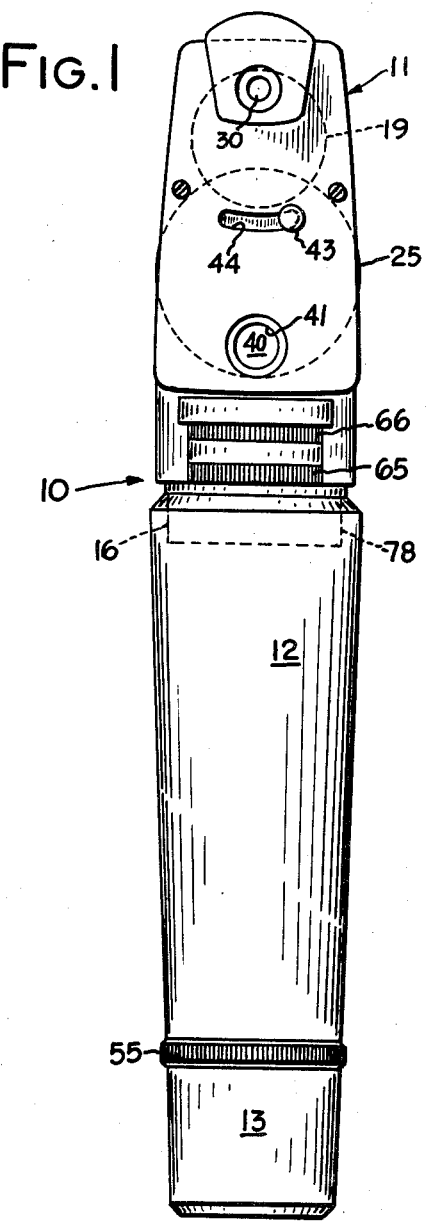
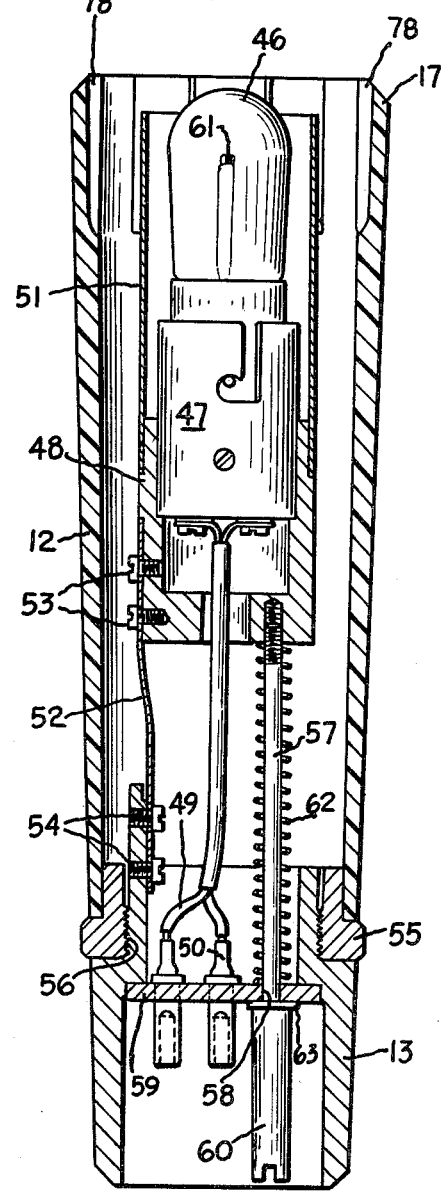
NORMAN D. ANDREAS
IRVING B. LUECK
INVENTORS
BY Frank C. Parker
ATTORNEY May 22, 1962   N. D. ANDREAS ET AL   3,035,483
OPHTHALMOSCOPE HAVING ADJUSTABLE LAMP AND COOLING VENTS
Filed Dec. 14, 1959   2 Sheets-Sheet 2

NORMAN D. ANDREAS
IRVING B. LUECK
INVENTORS

BY Frank C. Parker

ATTORNEY

United States Patent Office 3,035,483
Patented May 22, 1962

3,035,483
OPHTHALMOSCOPE HAVING ADJUSTABLE
LAMP AND COOLING VENTS
Norman D. Andreas, Greece, and Irving B. Lueck, Perinton, N.Y., assignors to Bausch & Lomb Incorporated, a corporation of New York
Filed Dec. 14, 1959, Ser. No. 859,170
2 Claims. (Cl. 88—20)

The present invention relates to a manually operable ophthalmological instrument, of the type commonly designated as an ophthalmoscope, for the examination of the retina of the eye.

It is an object of the present invention to provide an improved ophthalmoscope of the type including a pair of lens carriers having lenses of graduated diopter values selectively positionable in alignment with observation openings in the ophthalmoscope for varying the lens power through which the retina of the eye is examined.

In ophthalmoscopes of the aforementioned general type, it is conventional practice to provide an illumination lamp disposed within the body of the instrument and behind an aperture disk and a filter disk. It is further conventional practice to utilize a selectively positionable lens mechanism for affording either a macular image or an infinite image which may be deflected by a prism through a portion of one of the observation openings in the ophthalmoscope body and into the retina of the eye being examined.

A conventional problem generally encountered in ophthalmoscopes of the aforementioned type arises from the fact that it is difficult to assure substantial precise optical alignment of the illumination lamp filament with the filter and aperture disks, selectively positionable image controlling lenses and the deflecting prism. It is an object of the present invention, therefore, to provide means for adjustably positioning the illumination lamp in such a manner that the lamp filament may be adjusted exteriorly of the ophthalmoscope body in order to precisely align the filament in the desired position.

In connection with the foregoing objects of the present invention, it is contemplated that the illumination lamp base will be mounted at one side on a flexible metal strap which facilitates lateral movement of the lamp within the ophthalmoscope body. An adjusting screw which extends to the exterior of the ophthalmoscope body is cooperable with the lamp socket base in order to very accurately position the lamp within the body.

Another problem which is frequently encountered in conventional ophthalmoscopes arises from the fact that the light source generates heat which becomes annoying, particularly after the lamp has been turned on for any extended period of time. Accordingly, a further object of the present invention is to provide suitable means for venting or ventilating the ophthalmoscope body to thereby facilitate cooling the lamp and the portion of the ophthalmoscope body immediately adjacent to the lamp.

The foregoing objects as well as others and numerous advantages of the present invention will become more apparent from the following detailed description, when read in conjunction with the accompanying drawings, wherein:

FIG. 1 is an elevational view showing the ophthalmoscope body or housing;

FIG. 2 is an elevational sectional view illustrating the lower portion of the ophthalmoscope body and the mechanism enclosed therein;

Figure 3:
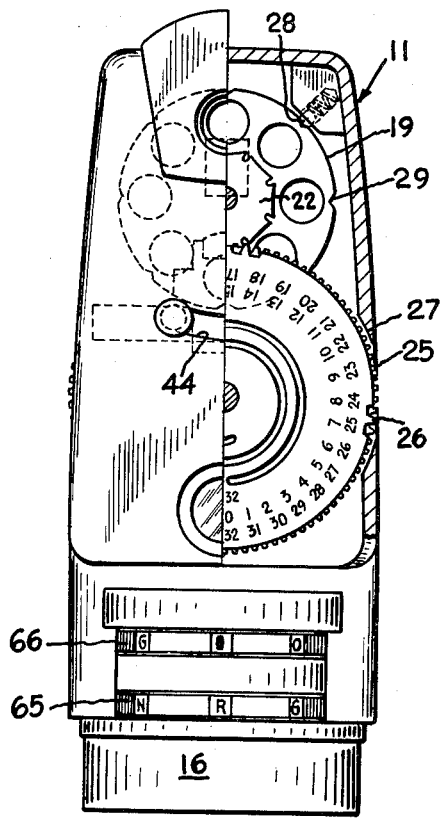
FIG. 3 is an elevational view, shown partly in section, illustrating the upper portion of the ophthalmoscope.
Figure 4:
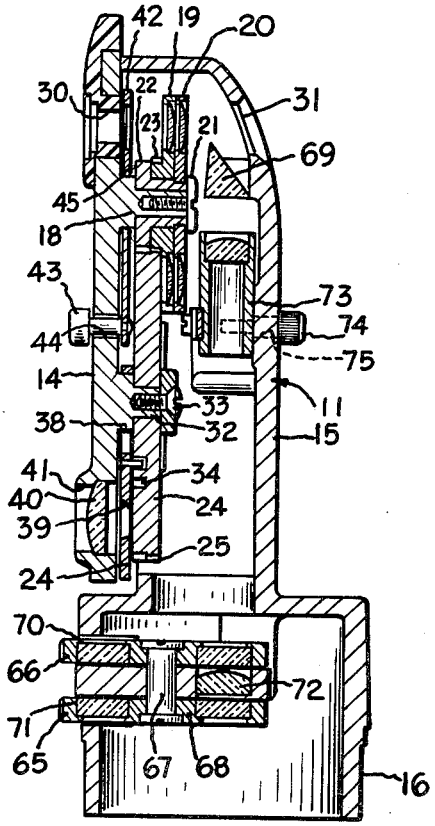
FIG. 4 is a sectional view taken at right angles to the view in FIG. 3 and illustrating the upper portion of the ophthalmoscope.
Figure 5:
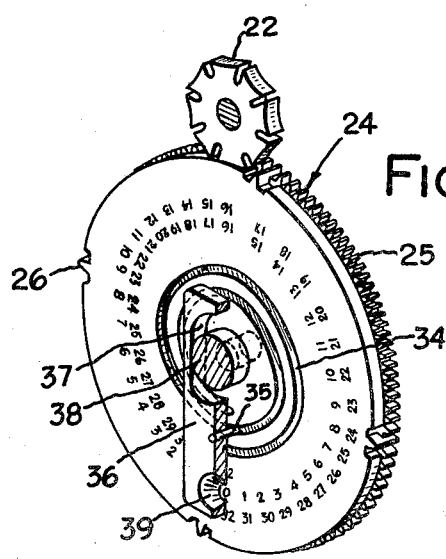
FIG. 5 is a perspective view showing the Geneva motion utilized in controlling the variable powered lens carrier disks through which the retina of the eye is viewed by the operator of the instrument.

With reference now to the drawings wherein like reference numerals have been used in the different views to identify identical parts, the ophthalmoscope disclosed herein comprises a body indicated generally by reference numeral 10 and comprising an upper portion 11, a medial portion 12 and a lower portion 13. The upper portion 11 of the ophthalmoscope body 10 is formed in two parts designated by reference numerals 14 and 15. The two parts 14 and 15 of the upper body portion 11 are formed so as to provide a substantially unitary body member having a bushing or sleeve-like portion 16 at its lower end adapted to be received within the upper end portion 17 of the medial body portion 12.

The part 14 of the upper body portion 11 is formed with an internal projection 18 on which a pair of lens carriers 19 and 20 are mounted for rotation, the lens carriers 19 and 20 being held in place by means of a bolt 21 threaded into mounting portion 18. The lens carriers 19 and 20 are respectively rotatable with gear members 22 and 23, each of which cooperates with gear member 24 and which together with gear member 24 form a Geneva motion for controlling the position of the lens carrier disks 19 and 20. The gear member 24 is provided with teeth 25 all the way around its periphery at one edge of the member and with four toothed portions 26 disposed 90° apart for cooperation with gear member 22. Gear member 23, which is secured to lens carrier 19, is in continuous mesh with teeth 25 so that any rotation of gear 24 by means of manual movement thereof will cause movement of the lens carrier 19. The teeth 25 project outwardly through slots 27 on either side of the portion 14 and facilitate manual movement of the gear 24. When the gear member 24 is rotated with the smooth portion of its periphery in engagement with gear member 22, there is no corresponding rotation of gear member 22 and lens carrier 20; however, when a tooth 26 engages with a tooth on the gear member 22, the gear member 22 is advanced one-eighth of a revolution. Thus, it will be seen that a full revolution of the gear 24 will cause gear member 22 and lens carrier disk 20 to rotate through 180° and during this rotation of these gears, the lens carrier 19 will have made four complete revolutions.

A suitable spring-actuated detent 28 is provided for cooperation with grooves 29 formed in the periphery of lens carrier 19 in order to retain the lens carriers 19 and 20 in fixed position with the lenses thereof in alignment with a pair of openings 30 and 31 disposed on opposite sides of the top portion 11 of the ophthalmoscope body.

The gear member 24 is rotatably mounted upon a projection 32 formed on the inside of member 14 and is held in place thereon by means of a screw 33, and a spiral groove 34 formed on the face of gear member 24 cooperates with a pin 35 projecting inwardly from a slide member 36. The slide member 36 is formed with a cut out portion 37 which abuts an enlargement 38 formed on projection 32 and as the gear member 24 is rotated, the pin 35, in following the groove 34, causes an aperture 39 formed in the slide 36 to be disposed over only one of the numeral indicia appearing on the face of gear member 24. Thus, the combination of diopter values represented by the lenses of lens carriers 19 and 20 which are disposed in alignment with openings 30 and 31 may be conveniently represented by the number, which may be either red or black, appearing when viewed through aperture 39. In order to facilitate reading the number in view within aperture 39, a suitable magnifying lens 40 disposed within an aperture 41 in portion 14 is provided.

A disk 42 formed with a pair of openings therein, one of which is completely open and the other of which is provided with a polarizing lens, is selectively positionable in alignment with openings 30 and 31 by means of a projection 43 which extends through a slot 44 in portion 14 of the upper ophthalmoscope body part 11. In order to retain the disk 42 in its selected position, a Belleville type spring washer 45 is disposed between gear member 22 and disk 42 and exerts slight pressure on both of them.

Means are provided for forming a source of illumination and such means comprise a lamp 46 disposed in the medial body portion 12, the lamp 46 being mounted within a socket 47 and the socket 47 being mounted within a socket base 48. A pair of suitable lead-in wires 49 and 50 are provided in order to transmit electrical current to the lamp 46.

The socket base 48 has a shield 51 which extends around the lamp 46 and is securely held by a frictional fit between socket base 48 and shield 51. A flexible strap 52 which is secured respectively to the socket base 48 by means of a pair of screws 53 and to the bottom body portion 13 by means of a pair of screws 54 securely holds socket base 48 to the bottom body portion 13. The bottom body portion 13 comprises a bushing member 55 which is glued within the bottom end of medial portion 12 and thus the entire lamp 46 and its mounting assembly may be threaded into the medial portion 12 by means of threads 56.

An adjusting screw 57 is threaded into the lower end of socket base 48 and extends through an opening 58 in a plate member 59, with the head 60 of said adjusting screw 57 projecting exteriorly of the body in order to provide for exterior adjustment of the position of the filament 61 of lamp 46. It is thus an easy matter to compensate for any inaccuracies in the location of the filament 61 by merely turning the screw 57 one way or the other in order to pivotally move the lamp 46 on mounting strap 52. A compression spring 62 is disposed between the bottom of socket base 48 and the top of plate 59 in order to retain the screw 57 with the collar 63 thereof in abutment with the bottom of plate 59 to thereby fix the position of the lamp filament 61.

A pair of disks 65 and 66 are respectively rotatably mounted by means of a mounting shaft 67 which extends through a projection 68 formed in the upper body portion 11. The disk 66 is formed with a plurality of different shaped apertures for controlling the configuration of the image which is formed by light rays emanating from filament 61 and passing through openings in the disks 65 and 66 to a reflecting prism 69. The disk 65 is provided with a plurality of different colored filters and thus both disks 65 and 66 are manually controllable as they project out through suitable openings 70 and 71 in the top body member 11. A converging lens 72 is mounted in optical alignment with the light path and a lens assembly 73 which may be manually positionable in either of two positions by means of a knob 74 which projects through a slot 75 in body member 15 in order to provide either a macular image or an infinite image of the light rays which emanate from the filament 61. The light rays emanating from the filament 61 therefore pass through the filter disk 65, converging lens 72, aperture disk 66, and imaging lens assembly 73, and are reflected and deflected by the reflecting prism 69 outwardly through the lower part of opening 31. Thus, an operator of the instrument looking through opening 31 and through the aligned openings in disk 42, 19 and 20 may direct the image onto the retina of the eye being examined and at the same time view how this image appears when so directed.

In order to overcome an obvious limitation in conventional ophthalmoscopes, the present ophthalmoscope utilizes a 12-watt lamp which is larger than is conventionally used and provides more light. The only drawback to the use of such a larger lamp is that it generates more heat which makes the ophthalmoscope undesirable to handle. The present invention provides a plurality of slots 78 around the inside of the upper end of the medial body member 12, which slots communicate with the interior of the ophthalmoscope body in the vicinity of illumination lamp 46, and thus the free circulation of air from within the ophthalmoscope body to the outside is facilitated. This has been found to effectively cool the ophthalmoscope body in the vicinity of the upper portion 11 by as much as 10° Fahrenheit. Such cooling is of a magnitude sufficient to enable the use of a sufficiently bright lamp to overcome the undesirability inherent when a smaller lamp is used.

It is contemplated that numerous changes and modifications may be made in the present invention without departing from the spirit or scope thereof.

What is claimed is:

1. In an ophthalmological instrument for the examination of the retina of the eye, an elongate generally hollow body, observation openings disposed oppositely with respect to said body and at one end thereof, means mounting an illumination lamp within said body, reflecting means disposed in optical alignment with the filament of said lamp and arranged with respect to said observation openings so as to deflect the light ray from said lamp through a portion of one of said observation openings into the retina of the eye to be examined, said lamp mounting means comprising a socket base, a flexible strap interconnecting one side of said socket base with one end portion of said body to thereby form a flexible pivotal mounting for said lamp, and screw adjusting means threaded into the lower end of said socket base and adjustable from the exterior of said body for controlling the pivotal position of said lamp and accordingly enabling the substantial precise optical alignment of said lamp filament with respect to said reflecting means.

2. In an ophthalmological instrument for the examination of the retina of the eye, an elongate generally hollow body, observation openings disposed oppositely with respect to said body and at one end thereof, lens carrier means of graduated diopter values rotatably mounted within said body and selectively positionable in alignment with said observation openings, means mounting an illumination lamp generally in the medial region within said body, selectively controllable lens means, apertures and filters disposed for selective optical alignment with said lamp, a reflecting prism disposed in optical alignment with the filament of said lamp and arranged with respect to said observation openings so as to deflect the light ray from said lamp through a portion of one of said observation openings into the retina of the eye to be examined while simultaneously the observation of the retina of the eye by the operator of the instrument through the opposite observation openings and the selected lens carrier means is effected over and across the upper edge of said reflecting prism, said lamp mounting means comprising a socket base, a flexible strap interconnecting one side of said socket base with one end portion of said body to thereby form a flexible pivotal mounting for said lamp, screw adjusting means threaded into the lower end of said socket base and adjustable from the exterior of said body for controlling the pivotal position of said lamp and accordingly enabling the substantial precise optical alignment of said lamp filament with respect to said reflecting prism, lens means, apertures and filters, and means forming vents around the inside of the upper end of the medial region through said body adjacent said lamp for enabling the circulation of air around said lamp to thereby facilitate cooling the lamp and the portion of said body disposed adjacent thereto.

References Cited in the file of this patent

UNITED STATES PATENTS

| | | |
|---|---|---|
| 1,782,705 | Armbruster | Nov. 25, 1930 |
| 1,873,675 | Tillyer | Aug. 23, 1932 |
| 2,624,537 | Rouy | Jan. 6, 1953 |
| 2,884,513 | Giller | Apr. 28, 1959 |